US008860610B2

(12) United States Patent
Hang et al.

(10) Patent No.: US 8,860,610 B2
(45) Date of Patent: Oct. 14, 2014

(54) ADDING MULTI-SYSTEM FUNCTIONALITIES TO LEGACY NAVIGATION SATELLITE SYSTEM RECEIVERS

(75) Inventors: Daming Hang, Shanghai (CN); Zongde Qiu, San Jose, CA (US); Rui Tang, Cupertino, CA (US); Daniel Babitch, San Jose, CA (US)

(73) Assignee: Cambridge Silicon Radio Limited, Cambridge (GB)

( * ) Notice: Subject to any disclaimer, the term of this patent is extended or adjusted under 35 U.S.C. 154(b) by 273 days.

(21) Appl. No.: 13/312,936

(22) Filed: Dec. 6, 2011

(65) Prior Publication Data

US 2013/0141277 A1    Jun. 6, 2013

(51) Int. Cl.
*G01S 19/33* (2010.01)

(52) U.S. Cl.
USPC .................................................. 342/357.73

(58) Field of Classification Search
USPC .................................................. 342/357.73
See application file for complete search history.

(56) References Cited

U.S. PATENT DOCUMENTS

| 5,914,685 | A | 6/1999 | Kozlov et al. | |
|---|---|---|---|---|
| 6,967,992 | B1 | 11/2005 | Rabaeijs et al. | |
| 8,405,546 | B1* | 3/2013 | Yeh et al. | 342/357.73 |
| 2008/0228398 | A1* | 9/2008 | Syrjarinne et al. | 701/213 |
| 2011/0025559 | A1 | 2/2011 | Chansarkar et al. | |
| 2011/0181468 | A1* | 7/2011 | Sun et al. | 342/357.73 |

FOREIGN PATENT DOCUMENTS

| CN | 101221233 | 7/2008 |
|---|---|---|
| CN | 101408606 | 4/2009 |
| CN | 102073056 | 5/2011 |
| EP | 1783512 | 5/2007 |
| EP | 2280292 | 2/2011 |
| GB | 2475407 | 5/2011 |
| GB | 2475410 | 5/2011 |
| WO | 01/39364 | 5/2001 |
| WO | 2009/142981 | 11/2009 |
| WO | 2011/090497 | 7/2011 |

OTHER PUBLICATIONS

SkyTraq, Product Summary—GLONASS/GPS Modules, 3 pages, available at http://www.skytraq.com.tw/products/products-glonass-gps-modules.html, downloaded Nov. 30, 2011.
British Search Report completed May 13, 2013 in corresponding GB1220369.1.
Search Report issued Mar. 4, 2014 in corresponding application No. CN201210519246.0.
Chencheng, "Dynamic GNSS Receiver and Researches of Multimode Decoding Techniques", Chinese Master's Thesis, Jul. 15, 2009, pp. 1-11.
Hongtao, "GPS Application Design", Science Press, May 31, 1999, pp. 298 and 304-307.

* cited by examiner

*Primary Examiner* — Harry Liu
(74) *Attorney, Agent, or Firm* — Pillsbury Winthrop Shaw Pittman LLP (57) ABSTRACT

Methods and apparatuses are disclosed for enabling a satellite-based navigation signal receiver to support multiple types of global navigation satellite systems (GNSS). A legacy GNSS receiver can support a plurality of GNSS types by software upgrade and with a new/modified radio frequency (RF) chip. There is no need to completely redesign a navigation host chip to support the multiple GNSS types. This invention offers a cost-efficient multi-GNSS solution without sacrificing the navigation performance. A GNSS baseband controller controls synchronization of measurement time for digitized data along a first signal processing path for a legacy GNSS signal and a second signal processing path for a non-legacy GNSS signal.

26 Claims, 9 Drawing Sheets

ADDING MULTI-SYSTEM FUNCTIONALITIES TO LEGACY NAVIGATION SATELLITE SYSTEM RECEIVERS

FIELD OF THE INVENTION

The present invention is related to positioning systems, and more particularly, to a method and apparatus of enabling a satellite-based navigation signal receiver to support multiple types of satellite systems.

BACKGROUND OF THE INVENTION

With the development of radio and space technologies, several satellites based navigation systems (i.e. satellite positioning system or "SPS") have already been built and more will be in use in the near future. Those systems with full global coverage are sometimes referred to as Global Navigation Satellite Systems ("GNSS"). SPS receivers, such as, for example, receivers using the Global Positioning System ("GPS"), also known as NAVSTAR, have become commonplace. Other examples of SPS and/or GNSS include but are not limited to the United States ("U.S.") Navy Navigation Satellite System ("NNSS") (also known as TRANSIT), LORAN, Shoran, Decca, TACAN, the Russian counterpart to NAVSTAR known as the Global Navigation Satellite System ("GLONASS"), any future Western European SPS such as the proposed "Galileo" program, or any other existing or future system such as the Chinese "Beidou" or "Compass" system. As an example, the U.S. NAVSTAR GPS system is described in GPS Theory and Practice, Fifth ed., revised edition by Hofmann-Wellenhof, Lichtenegger and Collins, Springer-Verlag Wien New York, 2001.

The U.S. GPS system was built and is operated by the United States Department of Defense. The system uses twenty-four or more satellites orbiting the earth at an altitude of about 11,000 miles with a period of about twelve hours. These satellites are placed in six different orbits such that at any time a minimum of six satellites are visible at any location on the surface of the earth except in the polar region. Each satellite transmits a time and position signal referenced to an atomic clock. A typical GPS receiver locks onto this signal and extracts the data contained in it. Using signals from a sufficient number of satellites, a GPS receiver can calculate its position, velocity, altitude, and time.

In the location/positioning industry, there are more and more demands for multi-system receivers instead of receivers that only supports the legacy navigation system), such as, GPS. However, it is very difficult to make a legacy GPS receiver to support multiple navigation satellite systems without significant hardware change, as most of the GPS receivers use the hardware correlator design and can not process other navigation satellite system signals without modifying the hardware. In addition, different systems use different modulation formats. For example, GLONASS uses Frequency Division Multiple Access (FDMA) scheme for signal communication, which is totally different from the Code Division Multiple Access (CDMA) scheme used by GPS and the Galileo systems. Therefore, processing of multiple types of communication signal becomes more dependant on hardware modification to support multi-system functionality.

It will be desirable to enable a legacy receiver to process satellite signals coming from satellites belonging to different types of GNSS. However, it is desirable to accomplish that via software upgrade, without having to redesign the hardware. The inventors are not aware of any software-based solution that is currently available to implement a multi-GNSS receiver.

SUMMARY OF THE INVENTION

This invention presents methods and apparatuses that enable a legacy GNSS receiver to support a plurality of GNSS types by software upgrade and with a new/modified radio frequency (RF) chip. There is no need to completely redesign a navigation host chip to support the multiple GNSS types. This invention offers a cost-efficient multi-GNSS solution without sacrificing the navigation performance.

In furtherance of these and other aspects, an exemplary method for determining a position of a navigation receive is disclosed, the method comprising: receiving a first navigation signal from a first global navigation satellite system (GNSS) at a radio frequency (RF) chip coupled to a navigation host chip included in the navigation receiver; receiving a second navigation signal from a second GNSS at the RF chip, where the second GNSS is a different type of GNSS than the first GNSS; synchronizing measurement time for digitized data from the second navigation signal with the measurement time for digitized data from the first navigation signal; and, using synchronized and processed measurement data obtained from both the first navigation signal and the second navigation signal to calculate position of the navigation receiver.

A navigation receiver is also disclosed, comprising: a radio frequency (RF) chip receiving a first navigation signal from a first global navigation satellite system (GNSS), and, a second navigation signal from a second GNSS, where the second GNSS is a different type of GNSS than the first GNSS; and, a navigation host chip coupled to the RF chip, wherein the navigation host chip synchronizes measurement time for digitized data from the second navigation signal with the measurement time for digitized data from the first navigation signal; and, uses synchronized and processed measurement data obtained from both the first navigation signal and the second navigation signal to calculate position of the navigation receiver.

In a further aspect, the second navigation signal comprises a plurality of frequency channels, and a second signal processing path includes a first-in-first-out (FIFO) data path and a corresponding soft correlator instance for each frequency channel. The first navigation signal may comprise a legacy GNSS signal.

In an additional aspect, a GNSS baseband controller controls synchronization of measurement time for digitized data along a first signal processing path for a legacy GNSS signal and a second signal processing path for a non-legacy GNSS signal.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

Overview

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

Note that in this application, the term Global Navigation Satellite Systems (GNSS) is used as the standard generic term for satellite navigation systems ("sat nav") that provide autonomous geo-spatial positioning with global coverage. In some instances, the term "GPS" has been used to broadly mean any legacy GNSS, including the specific SPS formally known as the Global Positioning System, as introduced in the Background Section of this application. Similarly, in some instances, the term "GLONASS" has been used to broadly mean any non-legacy GNSS, including the specific SPS formally known as GLONASS, as introduced in the Background Section of this application.

Figure 1:
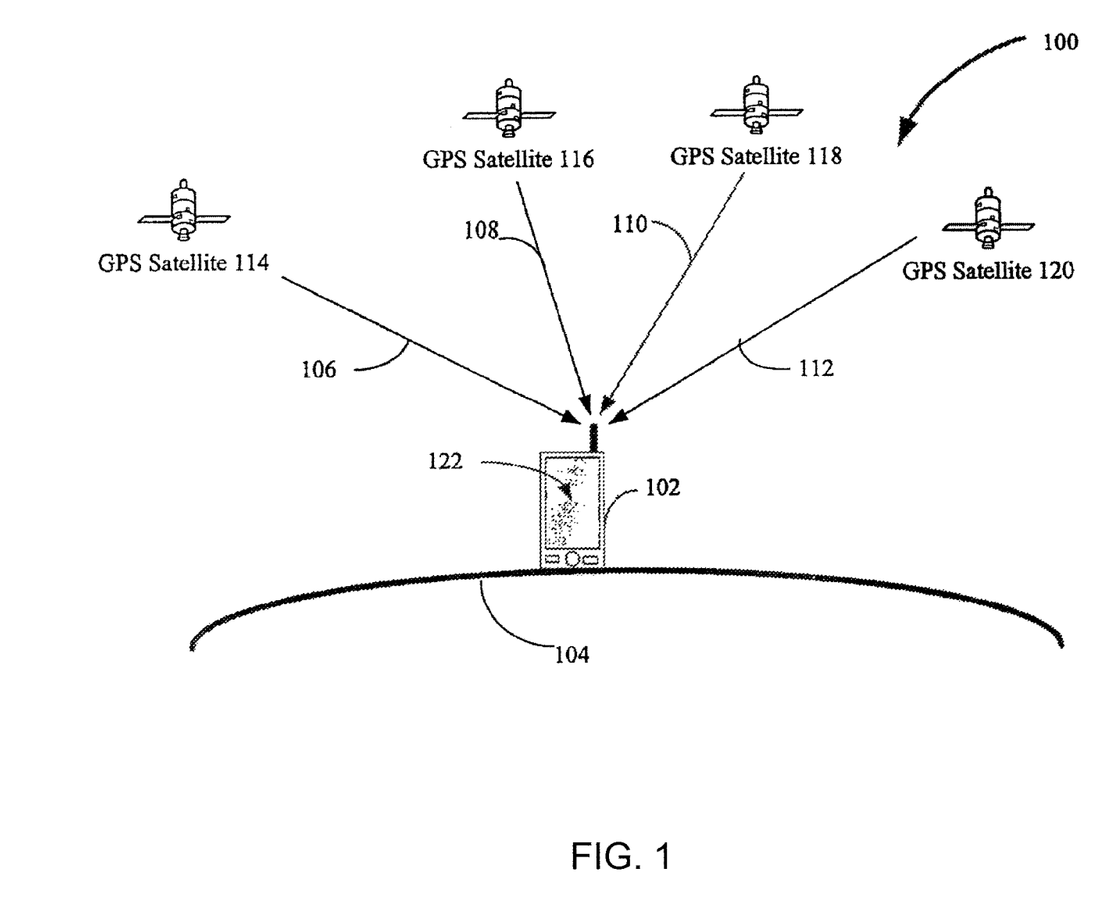
FIG. 1 is a block diagram of an example implementation of principles of the invention.

FIG. 1 illustrates an example system 100 for implementation of embodiments of the invention. As shown in FIG. 1, GPS satellites (i.e. SVs) 114, 116, 118 and 120 broadcast signals 106, 108, 110 and 112, respectively, that are received by receiver 122 in handset 102, which is located at a user position somewhere relatively near the surface 104 of earth.

Handset 102 can be a personal navigation device (PND, e.g. from Garmin, TomTom, etc.) or it can be a cellular or other type of telephone with built-in GPS functionality (e.g. iPhone, Blackberry, Android smartphone), or any GPS device embedded in tracking applications (e.g. automotive tracking from Trimble, package or fleet management tracking from FedEx, child locator tracking applications etc).

Receiver 122 can be implemented using any combination of hardware and/or software, including GPS chipsets such as SiRFstarIII GSD3tw or SiRFstar GSC3e from SiRF Technology and BCM4750 from Broadcom Corp., as adapted and/or supplemented with functionality in accordance with the present invention, and described in more detail herein. More particularly, those skilled in the art will be able to understand how to implement the present invention by adapting and/or supplementing such chipsets and/or software with the navigation solution improvement techniques of the present invention after being taught by the present specification.

One of the novel features of the invention is that a software approach is adopted to add a non-legacy satellite system baseband processing capability to the legacy baseband processing hardware. The present inventors recognize that the non-legacy satellite system signal may be difficult to be processed by pure software due to its characteristic features, which may be different from the legacy satellite system signal for which the legacy receiver is optimized. For example, GLONASS signals use FDMA, while the legacy GPS receiver is optimized for CDMA processing. To tackle that, in this invention, the solution is divided into two main parts: the first part is a channel-specific mixer, which is implemented in the hardware as part of the RF chip; and, the second part is a code correlator, which can be implemented by pure software inside the host chip for the receiver. Persons skilled in the art will recognize that systems other than GLONASS, e.g., the Compass satellite system being developed by China, can also be supported by only software upgrade in substantially the same way as building the GLONASS support in this invention with minor system-specific modifications.

The present invention offers some distinct advantages with respect to the conventional systems and methods. There is no need to redesign a new host chip to support GLONASS, Compass or other GNSS. Only software upgrade and a new RF chip are required. The extra cost to enable multi-GNSS function on a legacy GPS receiver is low while the navigation performance should be good enough.

Legacy GPS Receiver Architecture

Figure 2:
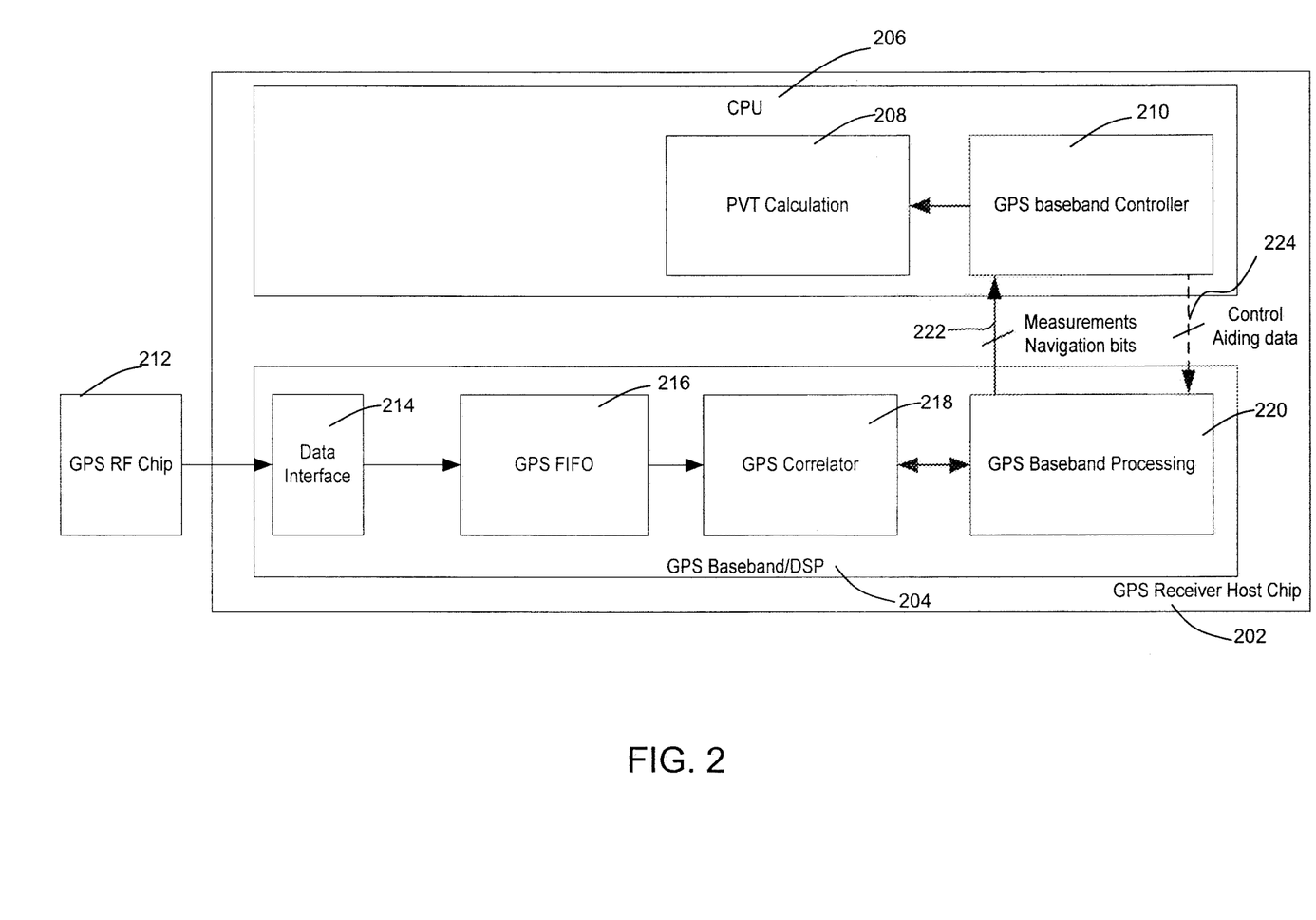
FIG. 2 illustrates an example architecture of a legacy GPS receiver.

A typical architecture of a legacy GPS receiver system is depicted in FIG. 2. The system comprises a GPS RF chip 212, coupled to a GPS receiver host chip 202. The GPS receiver host chip 202 has two major components: a GPS baseband/digital signal processing (DSP) portion 204, and a central processing unit (CPU) 206.

The GPS RF chip 212 sends digitized GPS baseband signal data to a GPS First-In-First-Out (FIFO) data channel 216 inside the GPS receiver host chip 202 through a specific data interface 214. A GPS correlator 218 and a GPS baseband processing module 220 process the data in the GPS FIFO 216 to demodulate the navigation bits and generate measurement data, which is transmitted to a GPS baseband controller module 210 via the communication link 222. The GPS baseband controller module 210 can also control the GPS baseband processing module (220)'s behavior, and/or provide aiding data, via communication link 224.

Upon further processing in the GPS baseband controller module 210, data is sent to a position-velocity-time (PVT) calculation module 208. The PVT calculation module 208 calculates and outputs the position, velocity, and time information for other applications to use.

Among these modules, the data interface 214, the GPS FIFO 216, GPS correlator 216, and the GPS baseband processing module 220 comprise integrated circuits (IC), i.e. implemented in hardware, wherein, the GPS baseband controller 210 and the PVT calculation module 208 comprise software modules running in the CPU 206.

Improved RF Chip Architecture

Figure 3:
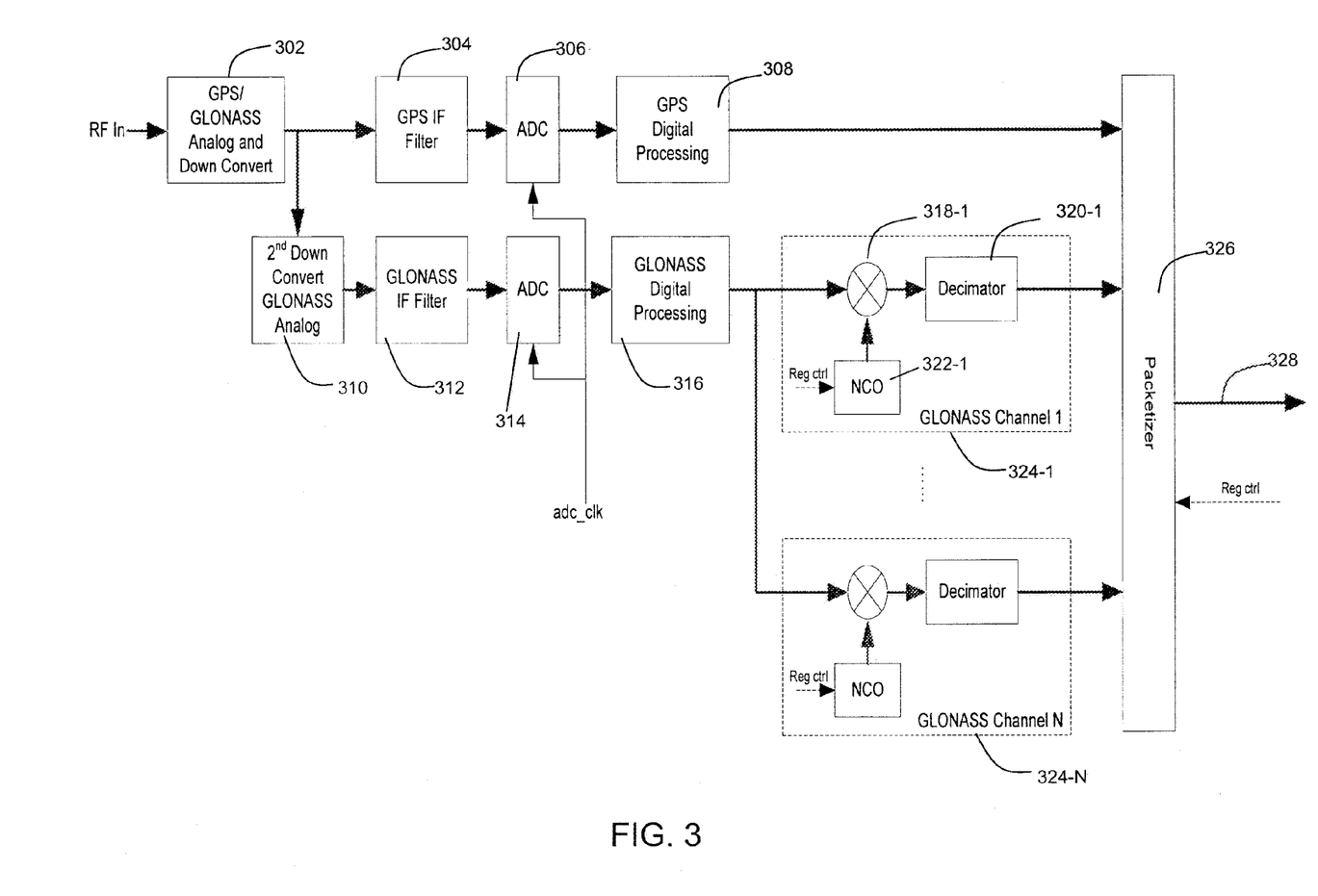
FIG. 3 shows components of a radio frequency chip, according to an embodiment of the present invention.

In order to make the legacy GPS architecture to support GLONASS (and/or other type of GNSS), the RF chip needs to be re-designed. However, the host chip only needs software upgrading in the scheme described in the example embodiment described herein. The re-designed RF chip architecture is depicted in FIG. 3.

The RF signal from the antenna (denoted as 'RF In') contains both the GPS band and the GLONASS band, it goes into both the GPS Analog module and the GLONASS analog module 302. Module 302 may also have at least a first stage of down-conversion capabilities.

The GPS analog module 302 down-converts the RF signal to an intermediate frequency (IF). GPS signal then goes through IF filter 304, and Analog-to-Digital Conversion (ADC) module 306. The A/D converted digital samples are processed in a GPS digital processing module processes the incoming GPS samples to the format that the legacy GPS baseband module 308. The processes include mixing and decimation/interpolation. Output of the module 308 is sent to a packetizer 326.

Optionally, anti jam functionality may be added to the digital processing module 308, so that the whole system can enhance the anti-jamming performance without having to redesign the GPS receiver host chip.

For the GLONASS signal, an additional stage of down-conversion may be performed in the analog module 310. GLONASS IF filter module 312, ADC module 314, and digital processing module 316 are equivalent to the GPS functional modules 304, 306, and 308 respectively.

To maintain the timing between GPS and GLONASS signals, the GPS ADC clock and the GLONASS ADC clock are derived from the same clock source. The clock signal is labeled as adc-clk.

The GLONASS digital processing module 316 processes the incoming GLONASS digital samples via a plurality of GLONASS channel-specific modules, indicated as 324-1 to 324-N (assuming there are N number of channels). The corresponding frequency channel numbers (FCN) for the GLONASS channels can be standard. For example, in an embodiment, FCNs span −7 to +6, each having an individual bandwidth of about 500 kHz, resulting in a total bandwidth requirement of about 3.7 MHz for complex sampling. Complex sampling refers to the simultaneous sampling of two different, but related, waveforms, resulting in pairs of samples that are subsequently treated as complex numbers. Complex sampling is often employed in digital signal processing schemes where the input signal is bandpass in origin and is to be processed using lowpass techniques. The output signal from the module 316 is 8 fx complex sampled, where fx is a frequency value very close to 1.023 MHz.

An anti jam functionality for GLONASS signal can also be added to module 316.

The full band GLONASS signal outputted by the module 316 is then sent to a number of GLONASS channel-specific modules 324. Each GLONASS channel-specific module mixes the incoming signal with a local configurable NCO (Numerically Controlled Oscillator) at a mixer to convert one specific GLONASS channel signal to zero-IF. The zero-IF signal is then decimated in a decimator to 1 fx complex sample rate. For the first channel, the mixer, the NCO and the decimator are labeled as 318-1, 322-1, and 320-1, respectively. As shown in FIG. 3, these components are included in each of the GLONASS channel-specific modules. The output of each GLONASS channel-specific module is 1 fx complex sampled data with zero-IF for the corresponding GLONASS channel.

The number of GLONASS channels is decided by the bandwidth of the RF chip. The NCO value of each GLONASS channel can be configured by the host chip through the data interface.

The GPS signal and all the signals from different GLONASS channels are sent to the packetizer 326, which packs the received data into packets with a specific format, and then sends out the packetized data 328 to an appropriate packetized interface (such as interface 750 in FIG. 7) that can receive and transmit packetized data.

The packetized interface can be any standard data interfaces that the legacy GPS receiver host supports. For example, Secure Digital Input Output (SDIO), Universal Serial Bus (USB), and Serial Peripheral Interface (SPI) are all possibilities for the packetized interface.

Figure 4:
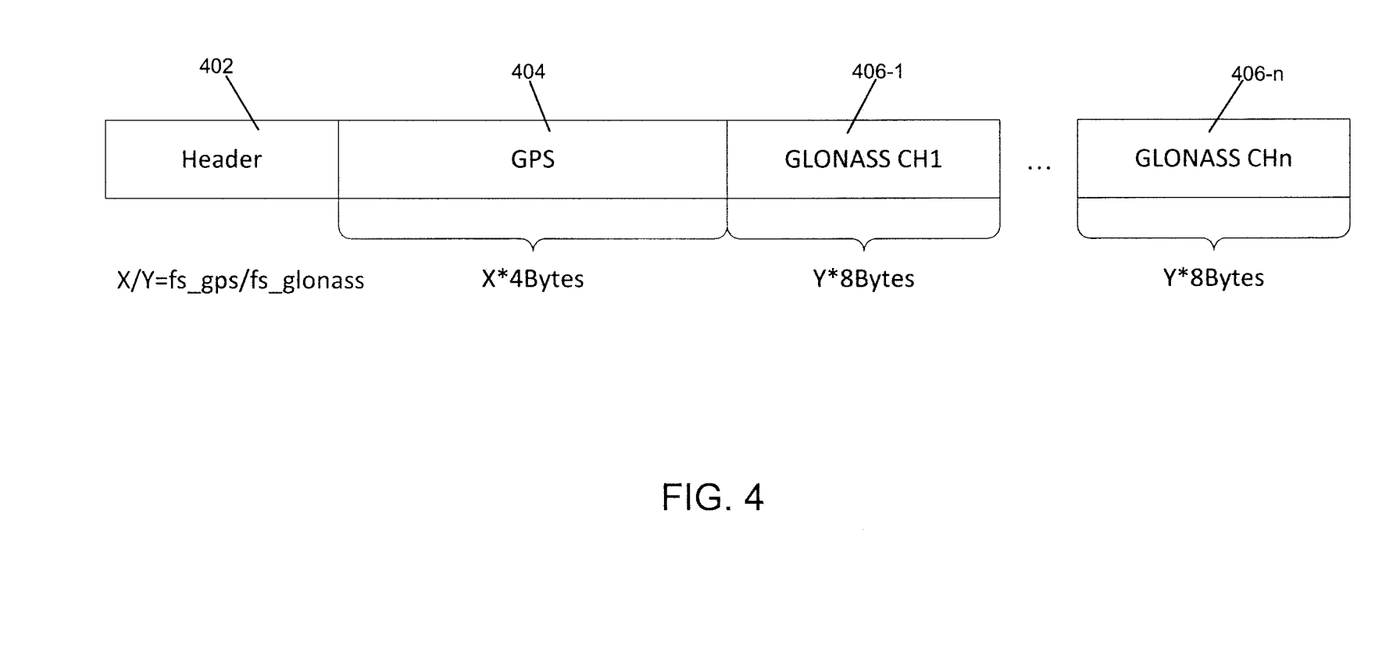
FIGS. 4-6 illustrate data packetization formats, according to aspects of the present invention.

The GLONASS data may be packed in the 32-bit-alignment format. Since GLONASS is 1 fx complex sampled, the format is 32-bits in-phase (I) data followed by 32-bits quadrature-phase (Q) data. Frequently in navigation system applications, 2-bit-quantization may be enough. FIG. 4 describes a data packet for the output data stream 328 coming out of the packetizer 326. In FIG. 4, X and Y are arbitrary numbers indicating the length of the payloads, where the ratio of X and Y depends on the sampling frequency of the GPS signal ($f_s\_gps$) and the sampling frequency of the GLONASS signal ($f_s\_glonass$). A time stamp can be added to the header, to maintain continuous timing information if data loss occurs in the packetized interface, as well as to keep timing synchronization between GPS and GLONASS signals.

Each combined packet of data shown in FIG. 4 contains a GPS field 404. The packet also contains several GLONASS fields 406-1 to 406-$n$ (assuming there are 'n' GLONASS channels), each GLONASS field corresponding to a GLONASS channel. There is also a header field 402 containing identification information for each packet.

Figure 5:
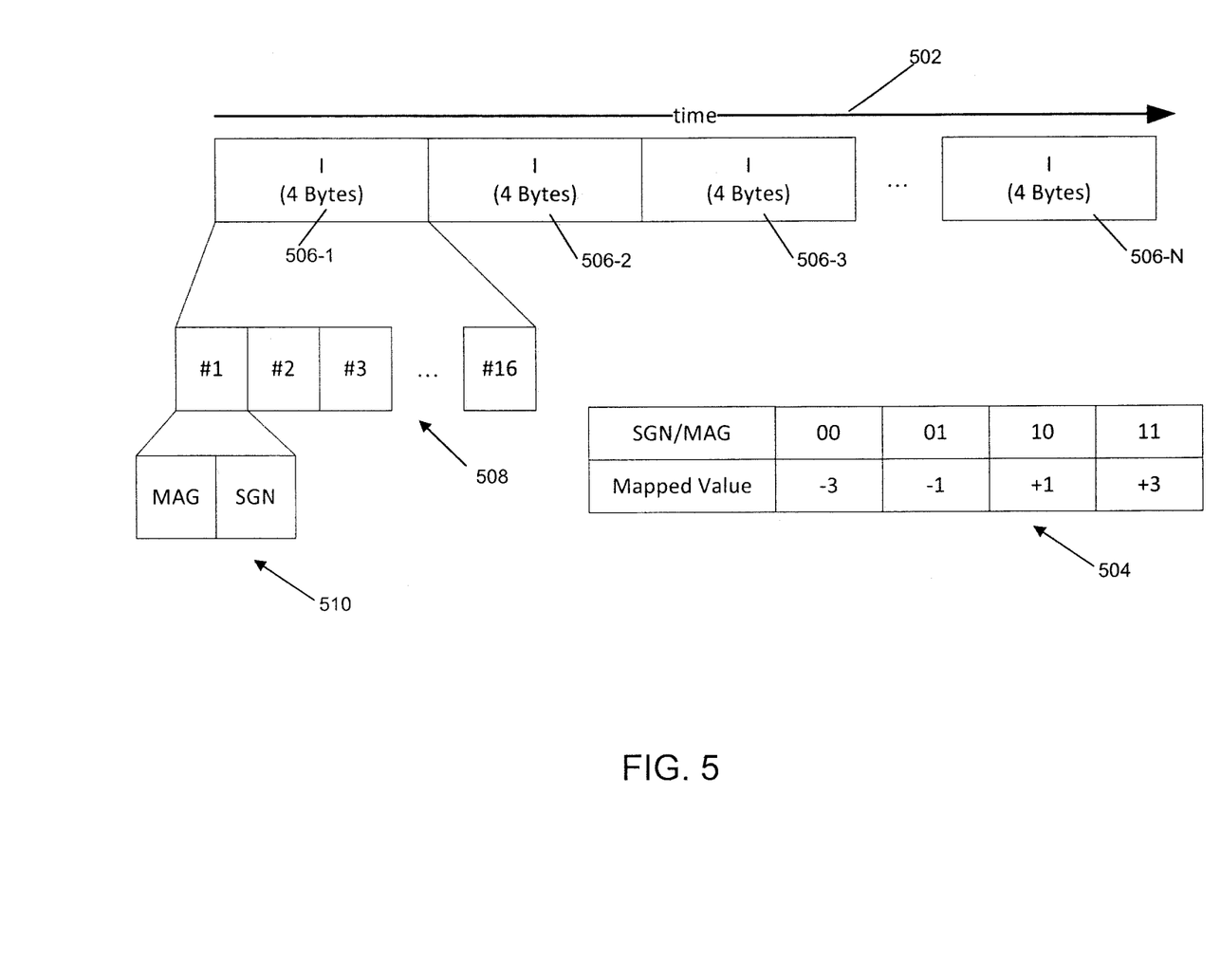

Being the same format as the legacy GPS data, the GPS signal in the combined packet is real sampled with 2-bits quantization. The data in GPS field is formatted as shown in FIG. 5. In FIG. 5, a time axis is shown as 502, along which the in-phase (I) samples 506-1 to 506-N are arranged. Each sample 506 contains several components 508 each having corresponding Sign/Magnitude (SGN/MAG) combinations 510. Table 510 shows corresponding mapped values for the SGN/MAG combinations 00, 01, 10, and 11.

Figure 6:
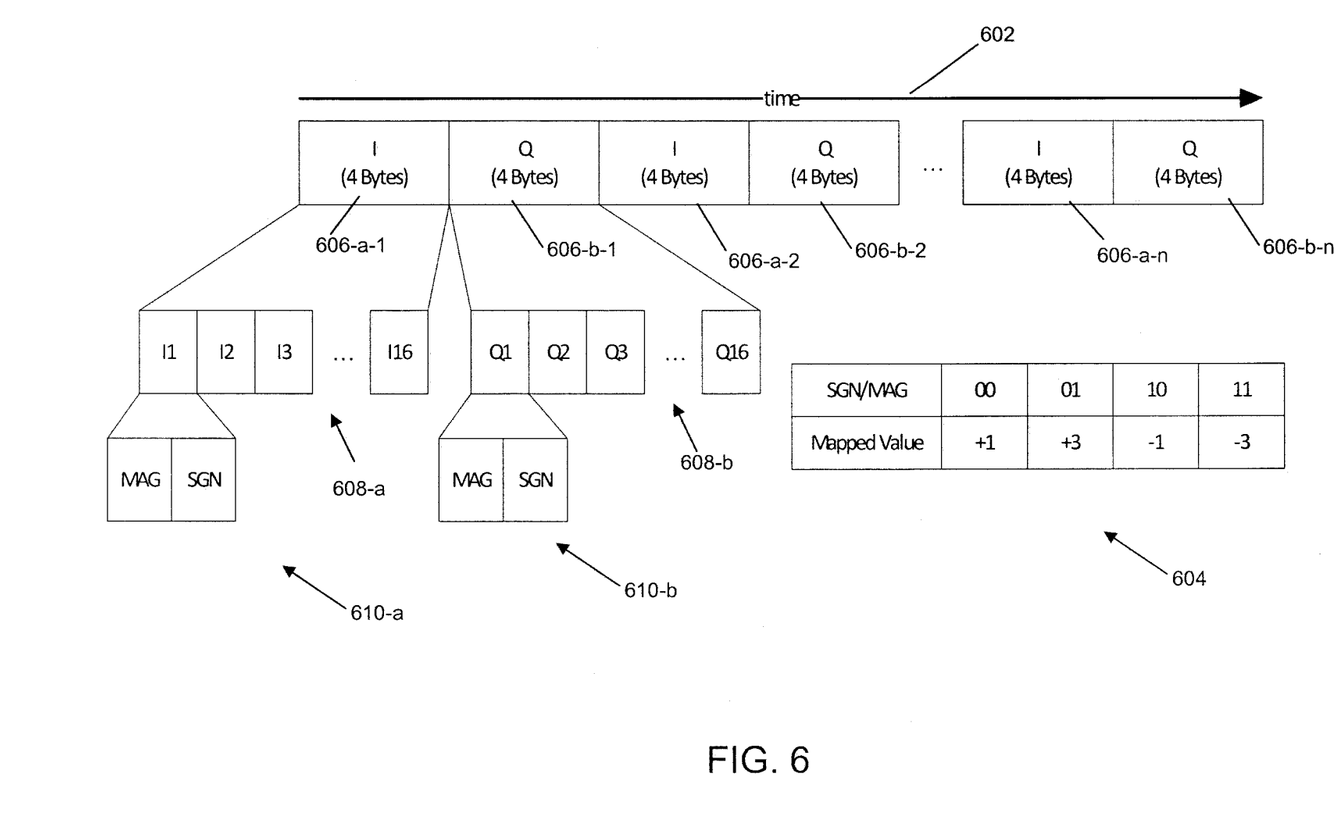

The data in each of the GLONASS channel fields is formatted as shown in FIG. 6. In FIG. 6, a time axis is shown as 602, along which the in-phase (I) samples 606-$a$ and quadrature-phase (Q) samples 606-$b$ are successively arranged from 606-$a$-1 and 606-$b$-1 all the way up to 606-$a$-$n$ and 606-$b$-$n$ (assuming there are n GLONASS fields). Each in-phase (I) sample 606-$a$ contains several components 608-$a$ each having corresponding Sign/Magnitude (SGN/MAG) combinations 610-$a$. Each quadrature-phase (Q) sample 606-$b$ contains several components 608-$b$ each having corresponding Sign/Magnitude (SGN/MAG) combinations 610-$b$. Since the GLONASS signal is processed by pure software in the host, the 2-bits coding mapping as shown in the table 604 is different from the one used by GPS (shown in table 504).

Software Upgrade of the GNSS Receiver

Figure 7:
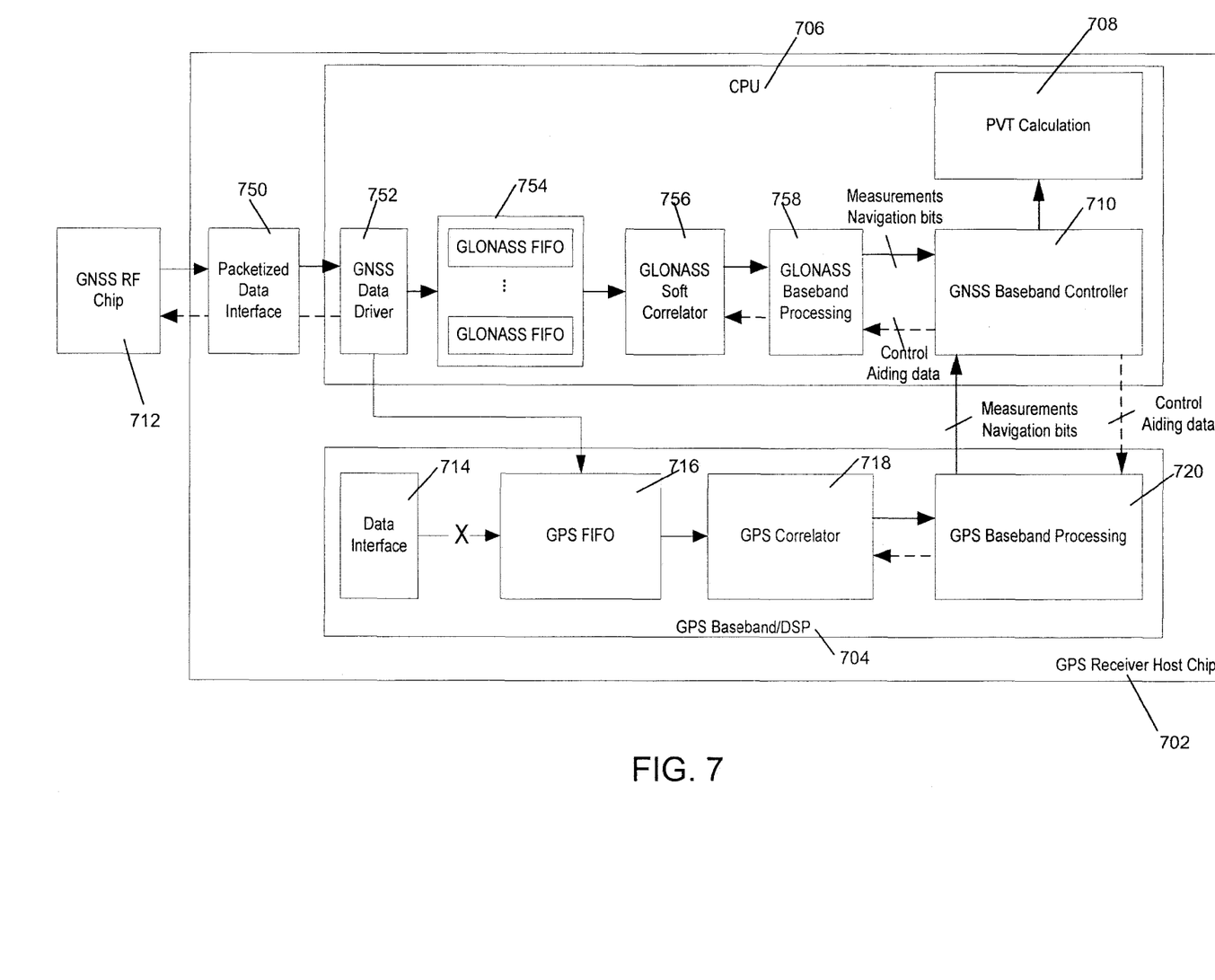
FIGS. 7 and 8 show two different embodiments of the present invention where a legacy GNSS navigation host chip can support a non-legacy GNSS signals.

The upgraded GNSS receiver architecture is depicted in FIG. 7.

In this architecture, the legacy data path from the hardware data interface 714 to GPS FIFO 716 is broken (as indicated by the 'X' in the data path), while GLONASS signal data comes from the new GNSS RF chip 712 and goes into the receiver host chip 702 through a certain packetized standard data interface 750. This is different from the configuration shown in FIG. 3. Instead of receiving the data from the RF chip to the GPS FIFO via interface 714, the host chip 702 receives the GPS+GLONASS packet data through the packetized data interface 750 and stores in the Dynamic Random Access Memory (DRAM) buffer (not shown specifically).

The GNSS data driver 752 processes the incoming packet and sends the GPS field data to the GPS FIFO 716, which is a part of Static Random Access Memory (SRAM) in the legacy GPS baseband module 702. This data path is accomplished by Direct Memory Access (DMA) channel.

The GNSS data driver 752 sends the GLONASS field data to different GLONASS FIFO channels (shown together in module 754), which reside in the DRAM. Each FIFO handles data from one GLONASS channel.

The GPS data in the GPS FIFO is processed by the legacy GPS baseband/DSP module 704 in the host chip 702. The GLONASS data in the GLONASS FIFO is processed by GLONASS soft correlator 756, which is an unique feature of this invention. The soft correlator 756 generates 1 ms accumulation results.

Since the GLONASS data is 32-bits-aligned and complementary-coded, it can be processed by pure software with quite low CPU loading (referred to as MIPS consumption). During the processing, each GLONASS channel has one FIFO and one corresponding soft correlator instance in the runtime software within the CPU 706.

The GLONASS baseband processing module 758 processes the 1 ms accumulation results from the soft correlators 756 to perform tracking loop and acquisition process. The navigation bits demodulation is also performed in module 758. The module can also configure the software correlator 756, including providing the start correlation sample pointer, code initial phase, code frequency, carrier initial phase, and carrier frequency.

The GLONASS baseband processing module 758 will output the measurements and the demodulated navigation bits. The measurements include each channel's sample pointer, code phase, code frequency, carrier phase and carrier frequency.

The GNSS baseband controller 710 is an updated version of the legacy GPS baseband controller 210 shown in FIG. 2. The upgrade in module 710 includes GLONASS signal processing capability. Controller 710 processes the GLONASS measurements and navigation bits sent from the GLONASS baseband processing module 758 as well as the GPS measurements and navigation bits sent from the GPS baseband processing module 720, which processes the GPS signal. The GPS FIFO 716, GPS correlator 718, and GPS baseband processing module 720 are substantially similar to modules 216, 218, and 220 shown in the legacy GPS architecture of FIG. 2.

The GNSS baseband controller 710 can also control the behavior of the GPS baseband processing module 720 and GLONASS baseband processing module 758 according to certain state transition. It can also provide aiding data to GPS baseband processing module 720 and/or GLONASS baseband processing module 758.

Similar to its function in the legacy chip shown in FIG. 2, the PVT calculation module 708 calculates and outputs the position, velocity, and time information for other applications to use.

An alternative architecture for adding GLONASS signal processing capability in a legacy GPS host chip involves maintaining the legacy 2-bit ADC interface for the GPS signal, while the GLONASS signal is fed into the host through the packetized interface. This alternative architecture is depicted in FIG. 8.

With this alternative architecture, there is no need to have the DMA path from the DRAM in GNSS data driver 852 to the GPS FIFO 816, as such a path may not be present in current System-on-Chip (SoC) configurations.

The elements 802, 804, 806, 808, 810, 814, 816, 818, 820, 852, 854, 856, and 858 are substantially similar in functionality to elements 702, 704, 706, 708, 710, 714, 716, 718, 720, 752, 754, 756, and 758 shown and described with respect to FIG. 7. RF chip 812 may be slightly different from RF chip 712. The GPS signal portion 811B in the RF chip 812 is separate from the other non-legacy GNSS signal (such as GLONASS signal) portion 811A. The packetized data interface 850 may receive data only from the portion 811A, while the legacy GPS data (no necessarily packetized) goes to data interface 814 via the legacy 2-bit ADC interface.

Figure 8:
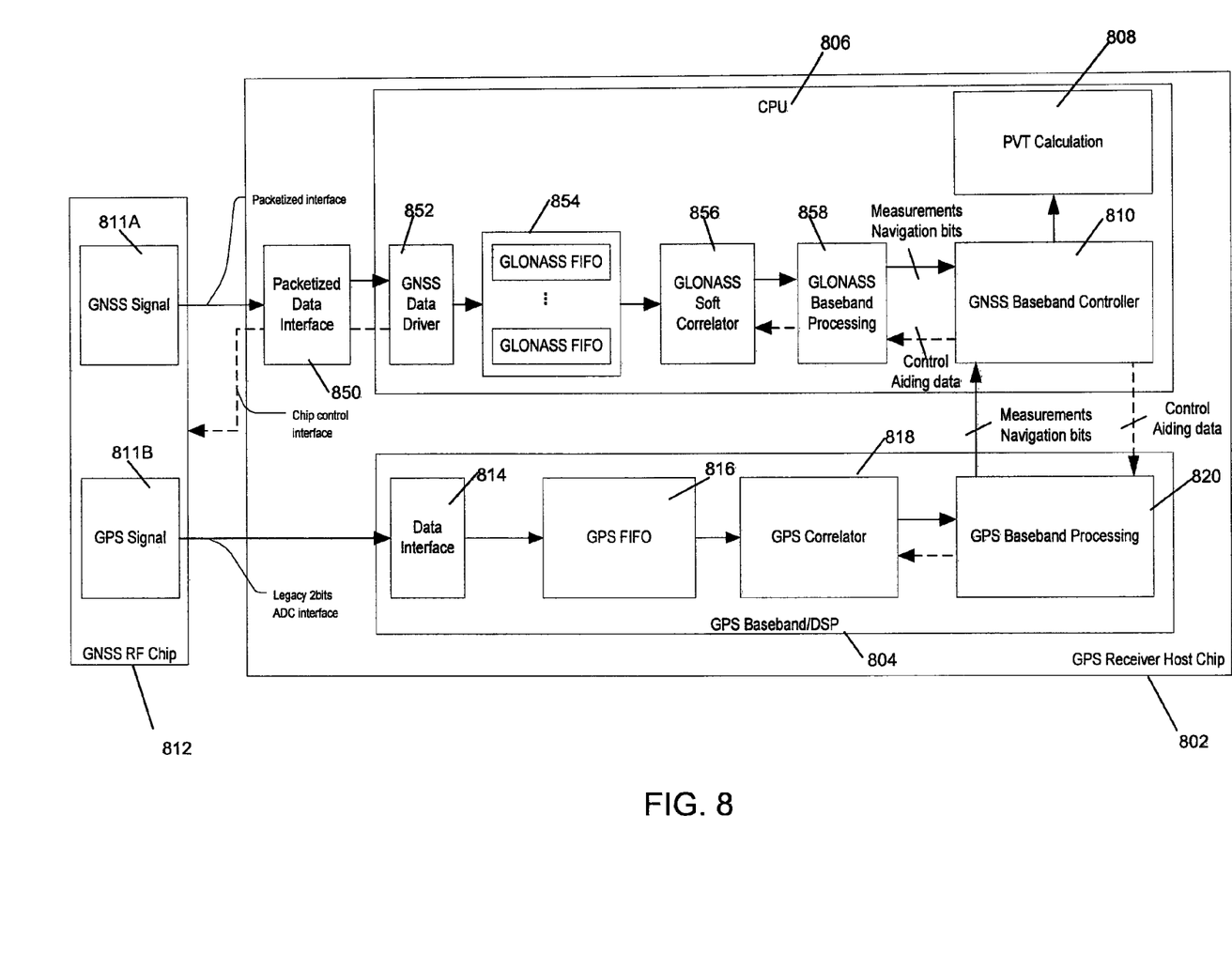

The architectures shown in FIGS. 7 and 8 are just two illustrative example embodiments, while many other variations can be envisioned without departing from the scope and principles of the present invention.

Synchronization of Different Types of GNSS Measurements

Figure 9:
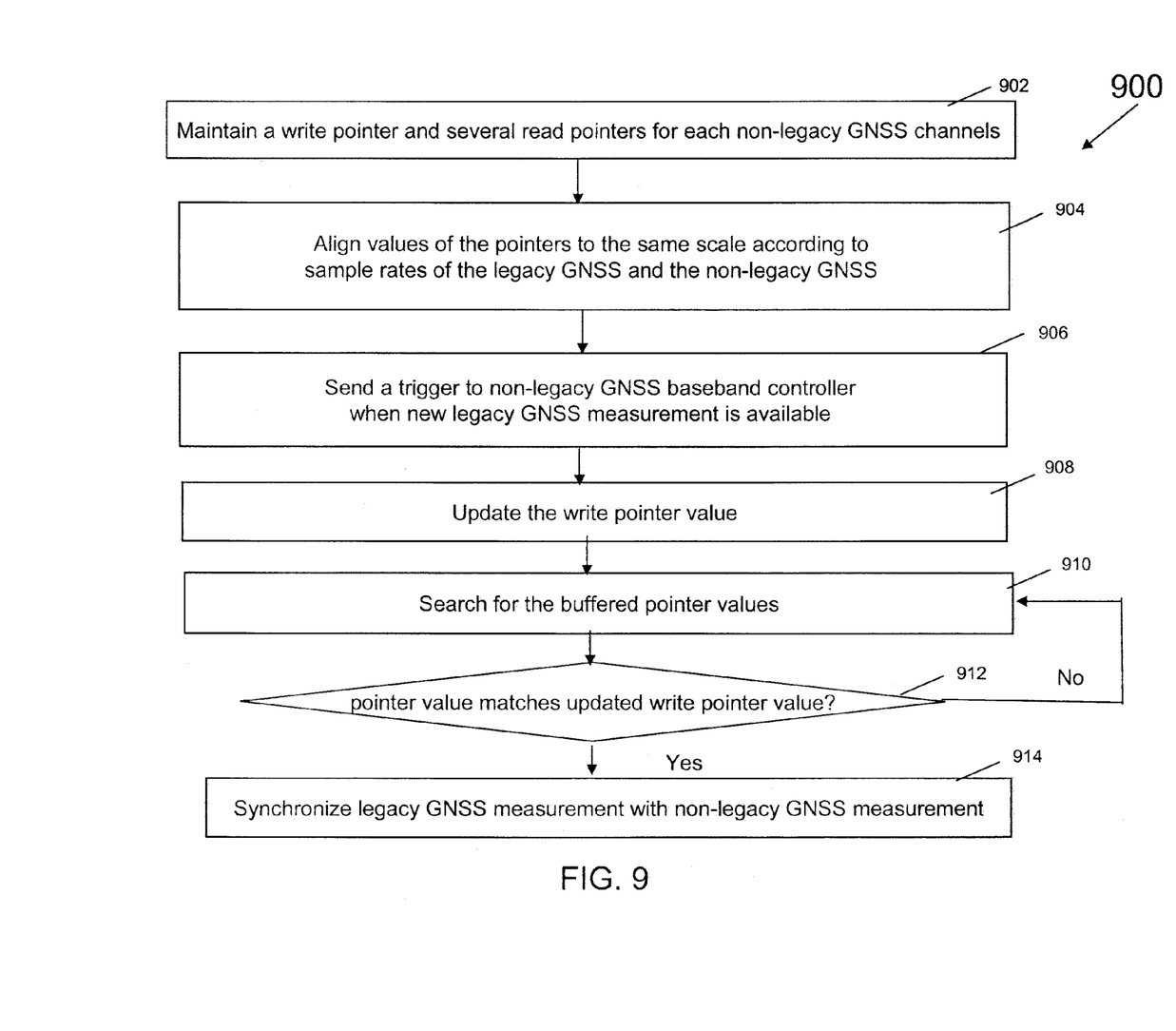
FIG. 9 is a flowchart illustrating an example methodology for time synchronization, in accordance with aspects of the invention.

FIG. 9 shows a flowchart 900 that depicts an example method of synchronizing measurement time between a legacy and a non-legacy GNSS signal, where both signals are used to find a positioning solution. In general, depending on the platform, measurement from two different GNSS systems are synchronized according to various schemes, such as, using the time stamp from a packet header of a first type of GNSS and using counters as a time snapshot to fetch the corresponding measurement from a second type of GNSS; using the post-first-fix time difference as a reference between the two types of GNSS, etc.

In order to do GPS/GLONASS combined positioning, the measurements from GPS and GLONASS must be synchronized to the same time. In the example architecture shown in FIG. 7, since GPS baseband processing module 720 is implemented in hardware, the embodiment uses the measured time of the GPS signal as the reference to find corresponding GLONASS time measurements.

To accomplish time synchronization, the GPS baseband processing module 720 and the GLONASS baseband processing module 758 both maintain a FIFO write pointer and several FIFO read pointers for different GLONASS channels (step 902). Values of these pointers are aligned to the same scale according to GPS/GLONASS sample rate (step 904). The FIFO write pointers are aligned to the time stamp in the packet header.

In the GLONASS baseband processing module 758, there is a buffer to store a number of latest measurements, each measurement set having a FIFO write pointer, which corresponds to the measuring time. The GPS baseband processing module triggers the GNSS baseband controller 710 when there are GPS measurements to be sent to the controller (step 906). When being triggered, the GNSS baseband controller gets the GPS measurements, and updates the FIFO write pointer value corresponding to the measurements (step 908). Then the GNSS baseband controller 710 searches the GLONASS measurements buffer to find the measurements whose FIFO write pointer value is closest to the GPS FIFO write pointer value (step 910). When the closest match is found in step 912, the search stops, and GPS and GLONASS measurements are synchronized in time (step 914).

Persons skilled in the art will appreciate that though GLONASS has been used as the non-legacy GNSS system in most of the above example embodiments, the scope of the invention is not limited to GLONASS only. For example, the satellite system being built by China, known as 'Compass,' can also be supported by a legacy navigation chip by appropriate software upgrade. In one embodiment, by changing the Local Oscillator (LO) frequency of a second Down Converter, the Compass signal can also be received by the RF analog part of a GNSS chip. Since Compass signal is not FDMA, only one of the GLONASS digital down converter channels needs to be used for Compass signal processing. Also, since Compass chip rate is 2.046 MHz, which means the bandwidth is about 4 MHz, the sample rate after decimation should be 4 fx instead of 1 fx. In other words, the architecture in the host chip for receiving Compass signal is substantially the same as that for GLONASS, with the exception that only one FIFO channel is required.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method for determining a position of a navigation receiver, the method comprising:
   receiving a first navigation signal from a first global navigation satellite system (GNSS) at a radio frequency (RF) chip coupled to a navigation host chip included in the navigation receiver;
   receiving a second navigation signal from a second GNSS at the RF chip, where the second GNSS is a different type of GNSS than the first GNSS;
   synchronizing measurement time for digitized data from the second navigation signal with the measurement time for digitized data from the first navigation signal; and
   using the synchronized measurement data obtained from both the first navigation signal and the second navigation signal to calculate position of the navigation receiver.

2. The method of claim 1, wherein the first GNSS is global positioning system (GPS).

3. The method of claim 2, wherein the second GNSS is one of GLONASS and Compass.

4. The method of claim 1, wherein the second navigation signal comprises a plurality of frequency channels.

5. The method of claim 4, wherein the step of synchronizing further comprises:
   maintaining a write pointer for the first navigation signal;
   maintaining a write pointer and a plurality of read pointers for each of the frequency channels of the second navigation signal;
   sending a trigger signal to a baseband controller when new measurement data is obtained from the first navigation signal;
   updating a value of the write pointer of the first navigation signal based on the trigger signal;
   searching the write pointers of the second navigation signal to identify a write pointer value that substantially matches with the updated value of the write pointer of the first navigation signal; and
   synchronizing measurement data obtained from the second navigation signal with measurement data obtained from the first navigation signal.

6. The method of claim 1, wherein a same clock source is used to process analog mixing and to control sampling time to digitize analog signals from the first navigation signal and the second navigation signal.

7. The method of claim 1, wherein data from the first navigation signal and the second navigation signal are packed in a combined data packet by a packetizer included in the RF chip.

8. The method of claim 7, wherein a time stamp is included in a header of the combined data packet to maintain continuous timing information to counter data loss in the packetized data interface.

9. The method of claim 7, wherein a packetized data interface sends the combined data packet to a data driver that routes data from the first navigation signal to a first signal processing path and routes the data from the second navigation signal to a second signal processing path.

10. The method of claim 9, wherein the second signal processing path includes a soft correlator.

11. The method of claim 1, wherein data from various frequency channels of the second navigation signal are packed in a data packet by a packetizer included in the RF chip, while data from the first navigation signal remain separate.

12. The method of claim 11, wherein a packetized data interface sends the data packet to a data driver that routes data from the second navigation signal to a second signal processing path and a separate data interface routes data from the first navigation signal to a first signal processing path.

13. The method of claim 12, wherein the second signal processing path includes a soft correlator.

14. A navigation receiver, comprising:
   a radio frequency (RF) chip receiving a first navigation signal from a first global navigation satellite system (GNSS), and, a second navigation signal from a second GNSS, where the second GNSS is a different type of GNSS than the first GNSS; and
   a navigation host chip coupled to the RF chip, wherein the navigation host chip synchronizes measurement time for digitized data from the second navigation signal with the measurement time for digitized data from the first navigation signal; and, uses the synchronized measurement data obtained from both the first navigation signal and the second navigation signal to calculate position of the navigation receiver.

15. The device of claim 14, wherein the navigation host chip comprises a first signal processing path for the first navigation signal; and, a second signal processing path for the second navigation signal.

16. The device of claim 15, wherein a GNSS baseband controller is coupled to both the first signal processing path and the second signal processing path to control synchronization of measurement time for digitized data along the first signal processing path and the second signal processing path.

17. The device of claim 15, wherein the second navigation signal comprises a plurality of frequency channels, and the second signal processing path includes a first-in-first-out (FIFO) data path and a corresponding soft correlator instance for each frequency channel.

18. The device of claim 15, wherein the first navigation signal comprises a single frequency channel, and the first signal processing path includes a first-in-first-out (FIFO) data path and a hardware-based correlator.

19. The device of claim 15, wherein data from the first navigation signal and the second navigation signal are packed in a combined data packet by a packetizer included in the RF chip.

20. The device of claim 19, wherein a packetized data interface sends the combined data packet to a data driver that routes data from the first navigation signal to the first signal processing path and routes data from the second navigation signal to the second signal processing path.

21. The device of claim 15, wherein data from various frequency channels of the second navigation signal are packed in a data packet by a packetizer included in the RF chip, while data from the first navigation signal remain separate.

22. The device of claim 21, wherein a packetized data interface sends the data packet to a data driver that routes data from the second navigation signal to the second signal processing path and a separate data interface routes data from the first navigation signal to the first signal processing path.

23. The method of claim 1, wherein synchronizing includes identifying a first measurement time for digitized data from the first navigation signal and finding a second measurement time for digitized data from the second navigation signal that most closely matches the first measurement time, the method further comprising obtaining synchronized measurement data from the digitized data from both the first and second navigation signals based on the synchronization.

24. The method of claim 1, further comprising:
adding timestamps to the digitized data from the first and second navigation signals, the timestamps corresponding to the respective measurement times,
wherein synchronizing includes using the timestamps.

25. The device of claim 14, wherein synchronizing includes identifying a first measurement time for digitized data from the first navigation signal and finding a second measurement time for digitized data from the second navigation signal that most closely matches the first measurement time, the navigation chip further obtains synchronized measurement data from the digitized data from both the first and second navigation signals based on the synchronization.

26. The device of claim 14, wherein the navigation chip further adds timestamps to the digitized data from the first and second navigation signals, the timestamps corresponding to the respective measurement times, and wherein synchronizing includes using the timestamps.

* * * * *

UNITED STATES PATENT AND TRADEMARK OFFICE
CERTIFICATE OF CORRECTION

| | | |
|---|---|---|
| PATENT NO. | : 8,860,610 B2 | Page 1 of 1 |
| APPLICATION NO. | : 13/312936 | |
| DATED | : October 14, 2014 | |
| INVENTOR(S) | : Hang et al. | |

It is certified that error appears in the above-identified patent and that said Letters Patent is hereby corrected as shown below:

In the Specification,

In Column 4, Line 63, delete "GPS correlator 216," and insert -- GPS correlator 218, --, therefor.

Signed and Sealed this
Thirty-first Day of March, 2015

Michelle K. Lee
*Director of the United States Patent and Trademark Office*